(12) United States Patent
Farrell

(10) Patent No.: US 11,447,300 B1
(45) Date of Patent: Sep. 20, 2022

(54) FOOD DELIVERY CONTAINER CLOSURE

(71) Applicant: Jemel Farrell, Spotsylvania, VA (US)

(72) Inventor: Jemel Farrell, Spotsylvania, VA (US)

( * ) Notice: Subject to any disclaimer, the term of this patent is extended or adjusted under 35 U.S.C. 154(b) by 135 days.

(21) Appl. No.: 16/984,282

(22) Filed: Aug. 4, 2020

(51) Int. Cl.
B65D 33/16 (2006.01)
B65D 33/34 (2006.01)
B65D 55/02 (2006.01)
F16B 1/00 (2006.01)

(52) U.S. Cl.
CPC ......... *B65D 33/1658* (2013.01); *B65D 33/34* (2013.01); *B65D 55/02* (2013.01); *F16B 1/00* (2013.01)

(58) Field of Classification Search
CPC .... B65D 33/1658; B65D 33/34; B65D 55/02; F16B 1/00
See application file for complete search history.

(56) References Cited

U.S. PATENT DOCUMENTS

| | | | |
|---|---|---|---|
| 3,571,861 A | 3/1971 | Olson | |
| 4,648,160 A * | 3/1987 | Spinosa | B65D 33/1658 24/30.5 R |
| 4,811,465 A * | 3/1989 | Folkmar | F25C 1/243 24/30.5 R |
| 5,457,858 A * | 10/1995 | Lin | A44B 99/00 24/511 |
| 5,802,677 A | 9/1998 | Dorman | |
| 6,398,028 B1 | 6/2002 | Stovall | |
| RE40,756 E | 6/2009 | Hall | |
| 8,142,075 B2 * | 3/2012 | Shaw | B65D 33/1691 383/34 |
| 8,550,714 B2 * | 10/2013 | Ben-Shushan | A45C 1/02 24/30.5 R |
| 9,428,307 B2 * | 8/2016 | Zerfas | B65B 9/20 |
| 2013/0330022 A1 * | 12/2013 | Turvey | B65D 33/1658 24/30.5 R |
| 2014/0150219 A1 * | 6/2014 | Burggren | B65D 33/1658 24/592.1 |
| 2016/0304235 A1 | 10/2016 | Herkenrath | |
| 2017/0305630 A1 | 10/2017 | Miller | |
| 2019/0077546 A1 * | 3/2019 | LeBlanc | B65D 75/70 |
| 2019/0077548 A1 * | 3/2019 | LeBlanc | B65D 33/2508 |

(Continued)

FOREIGN PATENT DOCUMENTS

WO 2019221955 11/2019

*Primary Examiner* — Robert Sandy
*Assistant Examiner* — Louis A Mercado
(74) *Attorney, Agent, or Firm* — Kyle A. Fletcher, Esq.

(57) ABSTRACT

The food delivery container closure is a clip. The food delivery container closure is a single use structure. The food delivery container closure is configured for use with packaging. The food delivery container closure permanently secures the packaging in the closed position. The food delivery container closure is a sacrificial structure. The food delivery container closure is damaged when the food delivery container closure is removed from the packaging. The food delivery container closure includes a first arm, a second arm, a torsion structure, and a release structure. The torsion structure attaches the first arm to the second arm to form a clip used to secure the packaging. The first arm and the second arm permanently attach to the packaging. The release structure damages the torsion structure such that the first arm and the second arm detach, allowing the packaging to open.

20 Claims, 2 Drawing Sheets

(56) References Cited

U.S. PATENT DOCUMENTS

2019/0248097 A1 8/2019 Maslana
2019/0352055 A1 11/2019 Tan
2019/0389619 A1 12/2019 Spataro

* cited by examiner ered from the present application are protected under the laws of the United States.

FOOD DELIVERY CONTAINER CLOSURE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including packaging, more specifically, a detail of a package not otherwise provided for. (B69D79/00)

SUMMARY OF INVENTION

The food delivery container closure is a clip. The food delivery container closure is a disposable structure. The food delivery container closure is a single use structure. The food delivery container closure is configured for use with packaging intended for use in transporting food. Examples of such packaging include, but are not limited to, a bag and a closing food tray. The food delivery container closure permanently secures the packaging in the closed position. The food delivery container closure is a sacrificial structure. The food delivery container closure is damaged when the food delivery container closure is removed from the packaging. The food delivery container closure is designed such that in order to tamper with the contents of the packaging, either the food delivery container closure or the packaging must be damaged. The food delivery container closure comprises a first arm, a second arm, a torsion structure, and a release structure. The torsion structure attaches the first arm to the second arm to form a clip used to secure the packaging. The first arm and the second arm permanently attach to the packaging. The release structure damages the torsion structure such that the first arm and the second arm detach, allowing the packaging to open.

These together with additional objects, features and advantages of the food delivery container closure will be readily apparent to those of ordinary skill in the art upon reading the following detailed description of the presently preferred, but nonetheless illustrative, embodiments when taken in conjunction with the accompanying drawings.

In this respect, before explaining the current embodiments of the food delivery container closure in detail, it is to be understood that the food delivery container closure is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the food delivery container closure.

It is therefore important that the claims be regarded as including such equivalent construction insofar as they do not depart from the spirit and scope of the food delivery container closure. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
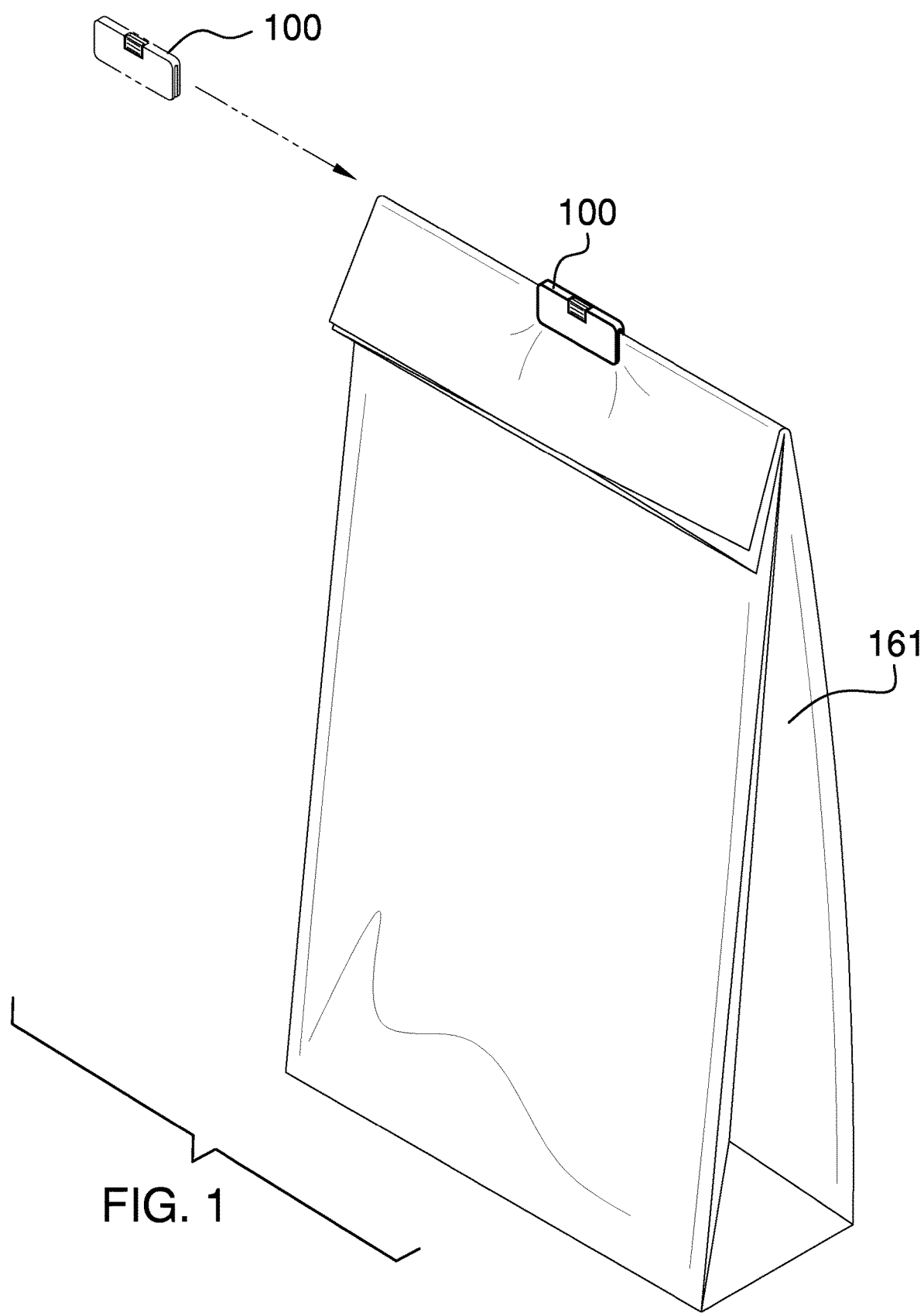
FIG. 1 is a perspective view of an embodiment of the disclosure.
Figure 2:
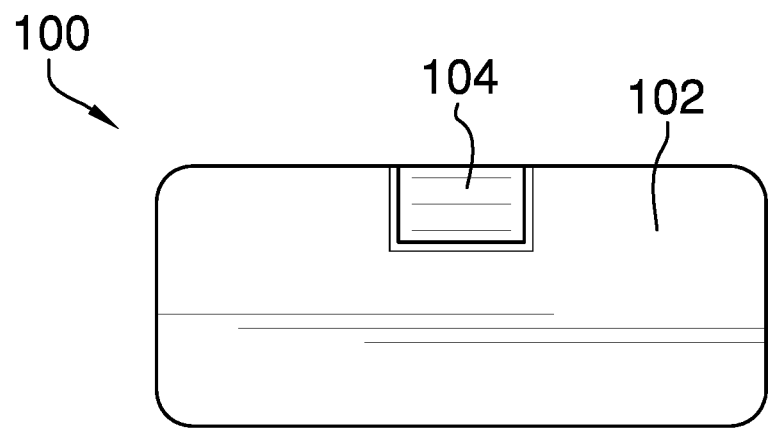
FIG. 2 is a front view of an embodiment of the disclosure.
Figure 3:
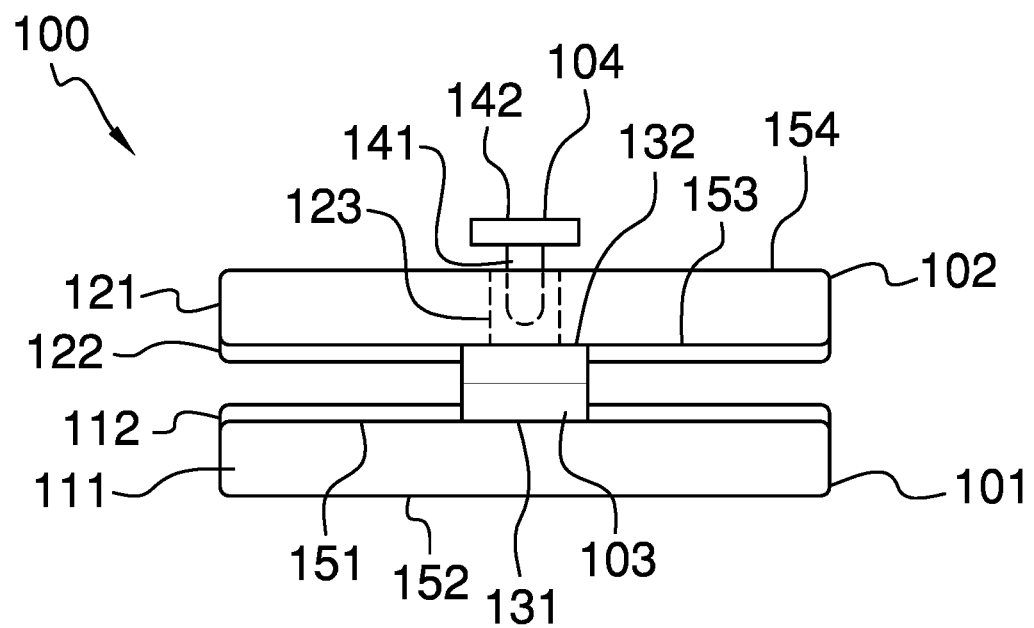
FIG. 3 is a top view of an embodiment of the disclosure.

Detailed reference will now be made to one or more potential embodiments of the disclosure, which are illustrated in FIGS. 1 through 3.

The food delivery container closure 100 (hereinafter invention) is a clip. The invention 100 is a disposable structure. The invention 100 is a single use structure. The invention 100 is configured for use with packaging 161 intended for use in transporting food. Examples of such packaging 161 include, but are not limited to, a bag and a closing food tray. The invention 100 permanently secures the packaging 161 in the closed position. The invention 100 is a sacrificial structure. The invention 100 is damaged when the invention 100 is removed from the packaging 161. The invention 100 is designed such that in order to tamper with the contents of the packaging 161, either the invention 100 or the packaging 161 must be damaged. The invention 100 comprises a first arm 101, a second arm 102, a torsion structure 103, and a release structure 104. The torsion structure 103 attaches the first arm 101 to the second arm 102 to form a clip used to secure the packaging 161. The first arm 101 and the second arm 102 permanently attach to the packaging 161. The release structure 104 damages the torsion structure 103 such that the first arm 101 and the second arm 102 detach, allowing the packaging 161 to open.

The torsion structure 103 is a brittle structure. The torsion structure 103 is a sacrificial structure. The release structure 104 damages the torsion structure 103 in order to release the first arm 101 from the second arm 102. By releasing the first arm 101 from the second arm 102 in this manner, the packaging 161 can open without damage to the packaging 161. The torsion structure 103 attaches the first arm 101 to the second arm 102. The torsion structure 103 is a rigid structure. The torsion structure 103 is a prism-shaped structure. The torsion structure 103 comprises a first lateral face 131 and a second lateral face 132.

The first lateral face 131 is the lateral face of the prism structure of the torsion structure 103 that attaches to the first congruent end 151 of the first disk structure 111. The second lateral face 132 is the lateral face of the prism structure of the torsion structure 103 that attaches to the third congruent end 153 of the second disk structure 121. The second lateral face 132 is the lateral face of the prism structure of the torsion structure 103 that is distal from the first lateral face 131.

The first arm 101 is a roughly disk-shaped structure. The first arm 101 forms the first arm 101 of a u-shaped structure. The first disk structure 111 acts as a spring. Specifically, when a force is applied perpendicularly to the prism structure of a first disk structure 111, the elasticity of the first disk structure 111 creates a rotational torque that opposes the displacement created by rotating the first disk structure 111 around a pivot point located where the first disk structure 111 is attached to the torsion structure 103. This rotational torque places a strain on the first disk structure 111 such that the force of the strain is in the direction that returns the first disk structure 111 to its original position. When the packaging 161 is inserted between the first disk structure 111 and the second disk structure 121, this spring like action produces a clamping force that holds the invention 100 securely in position against the packaging 161.

The first arm 101 comprises a first disk structure 111 and a first adhesive coating 112.

The first disk structure 111 is a prism-shaped structure. The first disk structure 111 is a roughly disk-shaped structure. The first disk structure 111 forms the first arm of a u-shaped structure that attaches to the packaging 161. The first arm 101 attaches to a first surface of the packaging 161. The first disk structure 111 comprises a first congruent end 151 and a second congruent end 152.

The first congruent end 151 is a congruent end of the roughly disk-shaped structure of the first disk structure 111. The first congruent end 151 is the congruent end of the first disk structure 111 that attaches to the first lateral face 131 of the torsion structure 103. The first congruent end 151 that faces the third congruent end 153 of the second disk structure 121. The second congruent end 152 is the congruent end of the roughly disk-shaped structure of the first disk structure 111 that is distal from the first congruent end 151.

The first adhesive coating 112 is a chemical substance. The first adhesive coating 112 is a coating applied to the first congruent end 151 of the first disk structure 111. The first adhesive coating 112 is a pressure sensitive adhesive. The first adhesive coating 112 permanently secures the first disk structure 111 to the first surface of the packaging 161. The first adhesive coating 112 is activated by pressing the first adhesive coating 112 against the second surface of the packaging 161.

The second arm 102 is a roughly disk-shaped structure. The second arm 102 forms the second arm 102 of a u-shaped structure. The second arm 102 attaches to a second surface of the packaging 161. The second disk structure 121 acts as a spring. Specifically, when a force is applied perpendicularly to the prism structure of a second disk structure 121, the elasticity of the second disk structure 121 creates a rotational torque that opposes the displacement created by rotating the second disk structure 121 around a pivot point located where the second disk structure 121 is attached to the torsion structure 103. This rotational torque places a strain on the second disk structure 121 such that the force of the strain is in the direction that returns the second disk structure 121 to its original position. When the packaging 161 is inserted between the second disk structure 121 and the first disk structure 111, this spring like action produces a clamping force that holds the invention 100 securely in position against the packaging 161.

The second arm 102 is geometrically similar to the first arm 101. The packaging 161 slips between the first arm 101 and the second arm 102 such that securing the first arm 101 to a first surface of the packaging 161 and securing the second arm to a second surface of the packaging 161 such that the packaging 161 is secured into a closed position. The rotation of the first arm 101 relative to the second arm 102 allows the packaging 161 to slip between the first arm 101 and the second arm 102.

The second arm 102 comprises a second disk structure 121, a second adhesive coating 122, and a release aperture 123.

The second disk structure 121 is a prism-shaped structure. The second disk structure 121 is a roughly disk-shaped structure. The second disk structure 121 forms the second arm of a u-shaped structure that attaches to the packaging 161. The second disk structure 121 comprises a third congruent end 153 and a fourth congruent end 154.

The third congruent end 153 is the congruent end of the second disk structure 121 that attaches to the second lateral face 132 of the torsion structure 103. The third congruent end 153 that faces the first congruent end 151 of the first disk structure 111. The fourth congruent end 154 is the congruent end of the roughly disk-shaped structure of the second disk structure 121 that is distal from the third congruent end 153.

The second adhesive coating 122 is a chemical substance. The second adhesive coating 122 is a coating applied to the third congruent end 153 of the second disk structure 121. The second adhesive coating 122 is a pressure sensitive adhesive. The second adhesive coating 122 permanently secures the second disk structure 121 to the second surface of the packaging 161. The second adhesive coating 122 is activated by pressing the second adhesive coating 122 against the second surface of the packaging 161.

The release aperture 123 is a negative space that is formed through the third congruent end 153 to the fourth congruent end 154 of the second disk structure 121. The release aperture 123 is sized to receive the release structure 104. The release structure 104 inserts into and through the release aperture 123 to access the torsion structure 103.

The release structure 104 is a striking tool. The release structure 104 transfers momentum from an externally provided source to the torsion structure 103. The impact of the release structure 104 against the torsion structure 103 causes damage to the torsion structure 103 that releases the first arm 101 from the second arm 102. The release structure 104 comprises a spit structure 141 and a base structure 142.

The spit structure 141 is a spit. The spit is defined elsewhere in this structure. The spit structure 141 is the working element of the release structure 104. The sharp apex of the pyramid component of the spit structure 141 is positioned such that the sharpened apex of the spit structure 141 that impacts the second lateral face 132 of the torsion structure 103. The impact of the spit structure 141 against the torsion structure 103 damages the torsion structure 103 such that the first arm 101 and the second arm 102 are separated.

The base structure 142 is a prism-shaped structure. The base structure 142 is a disk-shaped structure. The base structure 142 attaches to the congruent end of the prism component of the spit structure 141 that is distal from the pyramid structure of the spit structure 141. The base structure 142 forms a structure used to press the spit structure 141 into the second lateral face 132 of the torsion structure 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Apex: As used in this disclosure, an apex is a vertex that forms an extreme or solitary point of an object.

Brink: As used in this disclosure, a brink refers to the edge or line formed by the intersection of a first plane or surface and a second plane or surface wherein a cant exists between the first plane or surface and the second plane or surface.

Brittle: As used in this disclosure, brittle is an adjective used to describe a rigid structure that breaks easily.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastener that attaches to an object by gripping or clasping the object. A clip is typically spring loaded.

Closed Position: As used in this disclosure, a closed position refers to a movable barrier structure that is in an orientation that prevents passage through a port or an aperture. The closed position is often referred to as an object being "closed."

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Disposable: As used in this disclosure, disposable is an adjective that refers to an object that is designed and intended for a single use. Within this context, an object would be considered disposable if it is not reusable after its initial use.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Impact: As used in this disclosure, an impact refers to an exchange of momentum between two objects over a duration. An impact often refers to a collision between two objects.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pressure Sensitive Adhesive: As used in this disclosure, a pressure sensitive adhesive is an adhesive that is a permanently tacky adhesive that is activated by the application of pressure.

Perimeter: As used in this disclosure, a perimeter is one or more curved or straight lines that bounds an enclosed area on a plane or surface. The perimeter of a circle is commonly referred to as a circumference.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as a cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Sacrificial Structure: As used in this disclosure, a sacrificial structure is a first object or structure that protects a second object or structure from damage. More specifically, the sacrificial structure protects the second object or structure by being damaged instead of the second object or structure.

Sharp: As used in this disclosure, the term sharp refers to an apex or a brink that is formed in a first structure that is capable of puncturing or cutting a second structure.

Spit: As used in this disclosure, a spit refers to a composite prism structure formed by the combination of a prism and a pyramid such that the apex of the pyramid forms a point capable of pushing through the surface of a second structure.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Striking Tool: As used in this disclosure, a striking tool is a tool that exchanges momentum in a controlled manner between two objects through an impact. A hammer is an example of a striking tool.

Tool: As used in this disclosure, a tool is a device, an apparatus, or an instrument that is used to carry out an activity, operation, or procedure.

Torque: As used in this disclosure, a torque refers to a force that causes an object to rotate.

Torsion: As used in this disclosure, torsion refers to the application of a torque to an object.

Torsion Spring: As used in this disclosure, a torsion spring is a mechanical device that stores mechanical energy through an opposing torque when the mechanical device is bent or twisted. The torsion spring will return to its original relaxed shape when the twisting force is removed.

U-Shaped Structure: As used in this disclosure, a U-shaped structure refers to a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of the length of the first arm roughly equals the span of the length of the second arm.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A food delivery container closure comprising
a first arm, a second arm, a torsion structure, and a release structure;
wherein the torsion structure attaches the first arm to the second arm to form a clip used to secure a packaging;
wherein the release structure damages the torsion structure such that the first arm and the second arm detach;

wherein the food delivery container closure is the clip;
wherein the food delivery container closure is a disposable structure;
wherein the food delivery container closure is a single use structure;
wherein the food delivery container closure is configured for use with the packaging;
wherein the food delivery container closure permanently secures the packaging in a closed position;
wherein the food delivery container closure is a sacrificial structure;
wherein the food delivery container closure is damaged when the food delivery container closure is removed from the packaging.

2. The food delivery container closure according to claim 1 wherein the first arm and the second arm permanently attach to the packaging.

3. The food delivery container closure according to claim 2
wherein the torsion structure is a rigid structure;
wherein the torsion structure is a brittle structure;
wherein the torsion structure is a sacrificial structure;
wherein the release structure damages the torsion structure in order to release the first arm from the second arm;
wherein the torsion structure comprises a first lateral face and a second lateral face;
wherein the second lateral face is a lateral face of a prism structure of the torsion structure that is distal from the first lateral face.

4. The food delivery container closure according to claim 3
wherein the first arm is a disk-shaped structure;
wherein the first arm attaches to a first surface of the packaging;
wherein the first arm acts as a spring.

5. The food delivery container closure according to claim 4
wherein the second arm is a disk-shaped structure;
wherein the second arm attaches to a second surface of the packaging;
wherein the second arm acts as a spring;
wherein when the packaging is inserted between the first arm and the second arm, this spring like action of the first arm produces a clamping force that holds the food delivery container closure securely in position against the packaging.

6. The food delivery container closure according to claim 5
wherein the second arm is geometrically similar to the first arm;
wherein the packaging slips between the first arm and the second arm such that securing the first arm to the first surface of the packaging and securing the second arm to the second surface of the packaging such that the packaging is secured into the closed position.

7. The food delivery container closure according to claim 6
wherein the release structure is a striking tool;
wherein the release structure transfers momentum to the torsion structure;
wherein an impact of the release structure against the torsion structure causes damage to the torsion structure that releases the first arm from the second arm.

8. The food delivery container closure according to claim 7
wherein the first arm comprises a first disk structure and a first adhesive coating;
wherein the first adhesive coating is a coating applied to the first disk structure.

9. The food delivery container closure according to claim 8
wherein the second arm comprises a second disk structure, a second adhesive coating, and a release aperture;
wherein the second adhesive coating is a coating applied to the second disk structure;
wherein the release aperture is a negative space that is formed the second disk structure.

10. The food delivery container closure according to claim 9
wherein the release structure comprises a spit structure and a base structure;
wherein the base structure attaches to the spit structure.

11. The food delivery container closure according to claim 10
wherein the first disk structure is a roughly disk-shaped structure;
wherein the first disk structure forms a first portion that attaches to the packaging;
wherein the first arm attaches to the first surface of the packaging.

12. The food delivery container closure according to claim 11
wherein the second disk structure is a roughly disk-shaped structure;
wherein the second disk structure forms a second portion that attaches to the packaging.

13. The food delivery container closure according to claim 12
wherein the first lateral face is the lateral face of a prism structure of the torsion structure that attaches to a first congruent end of the first disk structure;
wherein the second lateral face is the lateral face of the prism structure of the torsion structure that attaches to a third congruent end of the second disk structure.

14. The food delivery container closure according to claim 13
wherein the first disk structure comprises the first congruent end and a second congruent end;
wherein the first congruent end is a congruent end of the roughly disk-shaped structure of the first disk structure;
wherein the first congruent end is the congruent end of the first disk structure that attaches to the first lateral face of the torsion structure;
wherein the first congruent end that faces the third congruent end of the second disk structure;
wherein the second congruent end is the congruent end of the roughly disk-shaped structure of the first disk structure that is distal from the first congruent end;
wherein the second disk structure comprises the third congruent end and a fourth congruent end;
wherein the third congruent end is a congruent end of the second disk structure that attaches to the second lateral face of the torsion structure;
wherein the third congruent end that faces the first congruent end of the first disk structure;
wherein the fourth congruent end is a congruent end of the roughly disk-shaped structure of the second disk structure that is distal from the third congruent end.

15. The food delivery container closure according to claim 14
- wherein the first adhesive coating is a chemical substance;
- wherein the first adhesive coating is applied to the first congruent end of the first disk structure;
- wherein the first adhesive coating is a pressure sensitive adhesive;
- wherein the first adhesive coating permanently secures the first disk structure to the first surface of the packaging;
- wherein the first adhesive coating is activated by pressing the first adhesive coating against the second surface of the packaging.

16. The food delivery container closure according to claim 15
- wherein the second adhesive coating is a chemical substance;
- wherein the second adhesive coating is applied to the third congruent end of the second disk structure;
- wherein the second adhesive coating is a pressure sensitive adhesive;
- wherein the second adhesive coating permanently secures the second disk structure to the second surface of the packaging;
- wherein the second adhesive coating is activated by pressing the second adhesive coating against the second surface of the packaging.

17. The food delivery container closure according to claim 16
- wherein the release aperture is the negative space that is formed through the third congruent end to the fourth congruent end of the second disk structure;
- wherein the release aperture is sized to receive the release structure;
- wherein the release structure inserts into and through the release aperture to access the torsion structure.

18. The food delivery container closure according to claim 17
- wherein the spit structure is a spit;
- wherein the spit structure is a working element of the release structure.

19. The food delivery container closure according to claim 18
- wherein the base structure is a prism-shaped structure;
- wherein the base structure is a disk-shaped structure;
- wherein the base structure attaches to a congruent end of a prism component of the spit structure that is distal from a pyramid structure of the spit structure.

20. The food delivery container closure according to claim 19
- wherein an impact of the spit structure against the torsion structure damages the torsion structure such that the first arm and the second arm are separated;
- wherein the base structure forms a structure used to press the spit structure into the second lateral face of the torsion structure.

* * * * *